J. F. RICHARDSON.
SCALE SUPPORTING FRAME.
APPLICATION FILED APR. 28, 1910.
993,407.
Patented May 30, 1911.
2 SHEETS—SHEET 2.
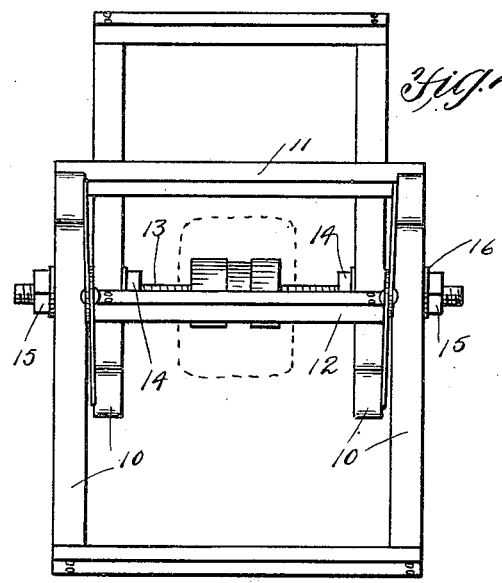
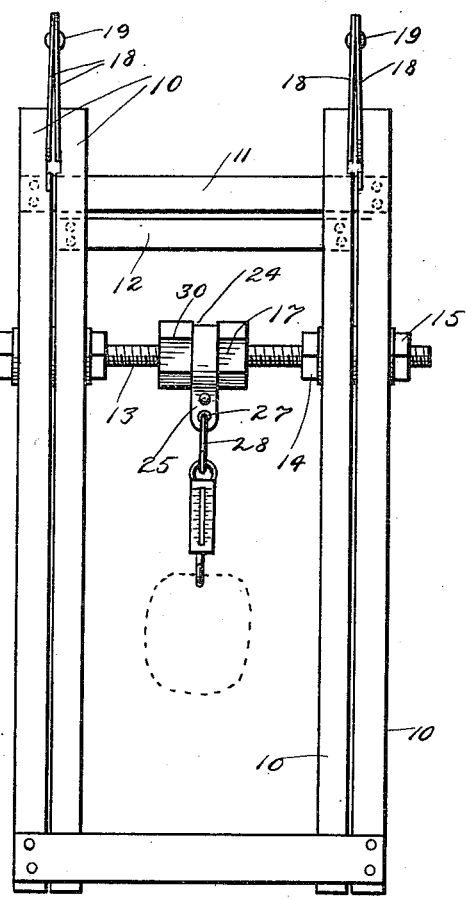
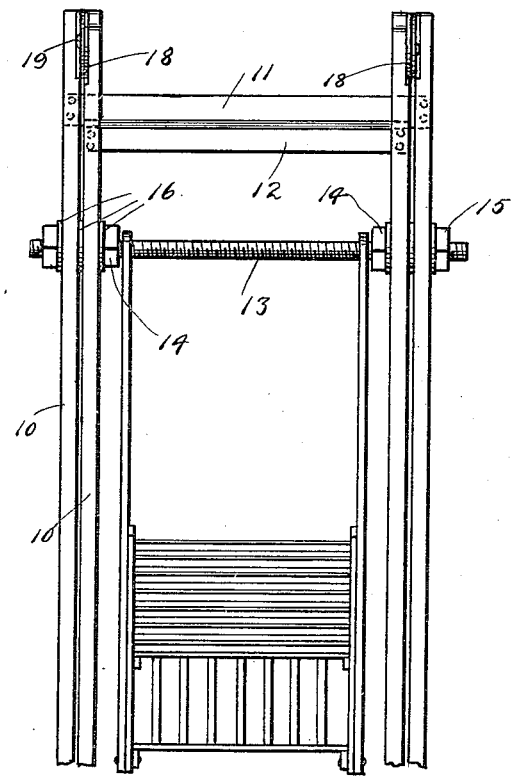
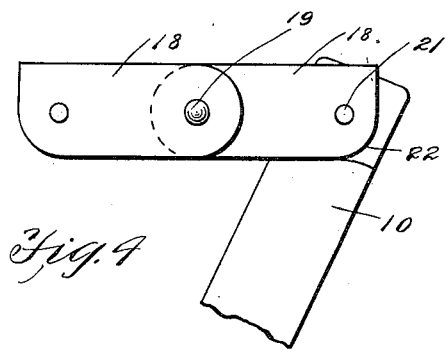
Witnesses
N. Abramson
J. Edwin Burch
Inventor
John F. Richardson
By Woodward & Chandlee
Attorneys

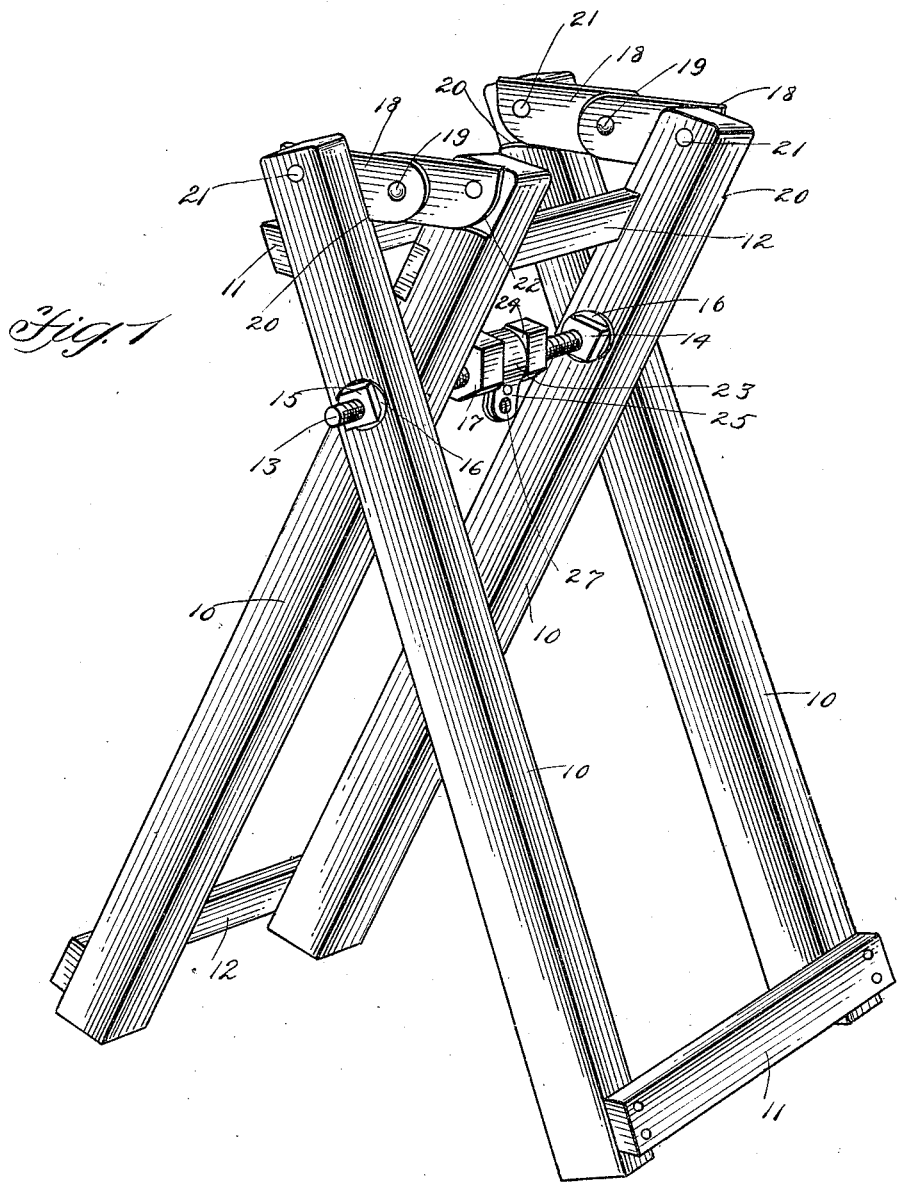

UNITED STATES PATENT OFFICE.

JOHN F. RICHARDSON, OF EDITH, TEXAS.

SCALE-SUPPORTING FRAME.

993,407.

Specification of Letters Patent.  Patented May 30, 1911.

Application filed April 28, 1910. Serial No. 558,177.

*To all whom it may concern:*

Be it known that I, JOHN F. RICHARDSON, a citizen of the United States, residing at Edith, in the county of Coke and State of Texas, have invented certain new and useful Improvements in Scale-Supporting Frames, of which the following is a specification.

This invention relates to scale-supporting frames and more particularly to such a device adapted for use in the weighing of cotton in the field.

It is well known in the usual operation of weighing cotton in the field, that the breast-yoke of the wagon is often placed under the wagon tongue so as to elevate the same for the supporting of the scales in the operation of weighing the cotton. The cotton is then loaded upon the wagon and taken to the gin, it being necessary by such reason to remove the scales from the tongue and to await the return of the team or teams before the other cotton can be weighed.

The present invention therefore has for its object to obviate these inconveniences and for this purpose I provide a foldable supporting frame for the scales which can be readily moved about the field for use as desired.

Another object of the invention is to provide a simple and efficient supporting frame of this character which may be manufactured at a nominal cost.

A further object is to so construct the frame that it may be used as a support for a swing or the like.

Other objects and advantages will be apparent from the following description and it will be understood that changes in the specific structure shown and described may be made within the scope of the claim without departing from the spirit of the invention.

Referring to the drawings in which like characters denote like parts throughout the several views: Figure 1 is a perspective view of my improved scale-supporting frame, showing the same in use, Fig. 2 is a top-plan view of the device in the position shown in Fig. 1, Fig. 3 is an end elevation of the device showing the same in a folded position, Fig. 4 is a detailed view on an enlarged scale showing the connection for the upper ends of the side bars, Fig. 5 is an end elevation of the device in use as a swing support.

Referring to the drawings in which I have illustrated my invention, there is shown the supporting frame which comprises a pair of approximately rectangular frames disposed one within the other and connected in pivotal relation. Each of said frames comprises the side bars 10, the outer frame of which is provided with the brace rods 11 which are disposed upon the opposite ends of the bars 10 and upon opposite side faces thereof, so as to rigidly brace said bars in parallel relation.

The inner frame is of a width to be snugly received within the side bars of the outer frame and said inner frame is also provided with the brace rods 12, the lowermost of which is disposed upon the outer edges of said bars opposite to the position of the brace rod 10 disposed at the lower end of the outer frame and the uppermost brace rod 12 is preferably seated within mortises in the inner edges of said bars forming the inner frame, so that said inner frame may be moved upon the transverse pivot rod 13 to a position within the outer frame and with the side bars coincident.

The transverse pivot rod 13 is disposed through the side bars a short distance below their upper ends and is preferably screw threaded throughout its length so that the nuts 14 may be disposed thereon inwardly of the side bars of the inner frame and in snug engagement with the inner faces of said bars but still allowing of free movement of said frame within the outer frame. The nuts 15 are also positioned upon the outer ends of the transverse pivot rod 13 and suitable washers 16 are preferably disposed between each pair of bars and between the nuts and the bars, so that said parts may have a free working surface and thereby adapting the device to be readily folded or opened as desired.

The upper brace rod 12 is disposed beneath the upper brace rod 11, as shown and in this position positively insures against the accidental disconnection of the parts forming the two frames and also allows the inner frame to be received within the outer frame in a most compact form. As will also be noted the transverse pivot rod 13 is screw threaded throughout its length so that a scale-supporting sleeve 17 which is mounted thereon may be moved or adjusted longitudinally of said rod, in order to position the scales centrally between the side bars of the inner frame to insure against the tipping over of the frame when the cotton is being weighed. To further assist in bracing the frames in their open position, the upper ends are pivotally connected by suitable links 18, preferably formed of metal and also pivotally connected together at their inner ends, as shown at 19, the inner ends thereof being rounded off so as to obviate the formation of any sharp projections which would be liable to injure a person in handling the frame. As will be noted said links 18 are seated within suitable rabbeted portions 20 formed at the upper ends of said bars and upon the coacting inner faces thereof, so that the links 18 may be received therein for pivotal movement without separating the coacting side bars to which said links are connected. The lower end walls of said rabbeted portions 20, as is more specially shown in Fig. 3 of the drawings, is extended downwardly and inwardly from a point approximately below the pivots 21, where said links 18 are connected to the side bars and the outer portions of said end walls are extended outwardly at right angles to the longitudinal edges of said bars so that the rounded lower corners 22 of said links will have sufficient space for rotation in folding or separating the frames, and also to form a support for the lower edges of said links when the frames are in an open position, thereby more rigidly holding the frame from accidental collapsement.

In operation, it is of course understood that the sleeve member 17, which is interiorly screw threaded, is positioned upon the transverse pivot rod 13, centrally of its length, after which the parts are properly mounted thereon and said sleeve member 17 is also provided with a yoke 23 which is slidably mounted within a circumferential groove 24 disposed centrally of the length thereof and preferably constructed of malleable metal so that the same may be provided with a pair of outstanding ears 25 which may be riveted together and in order that the scales 26, of any well known or desired form may be hung therefrom I provide said ears with registering apertures 27, through which the engaging hook 28 of the scales may be passed. As the yoke 23 is slidable within the groove 24, the scales may be hung from the ears 25 and if not properly centered, a suitable wrench may be applied to the operating portion or sides 30 of said sleeve and the same thereby rotated upon the transverse externally screw threaded pivot rod 13 and the scales thereby positioned centrally of the side bars forming the inner frame, after which the cotton may be hung from the scales and weighed, it being understood that the operation is preferably made from the side at which the outer frame is extended and the material weighed positioned therebetween.

When the device is in use as a swing support the same may be conveniently suspended from the rod 13, as shown in Fig. 5 of the drawings and it will be apparent that the second use of the frame will greatly enhance its commercial value, especially in the off season of the year. Also by having the frame foldable, it may be readily moved around the field and the cotton may be weighed and set off in separate piles without the usual inconvenience heretofore met with.

What is claimed is:

A scale supporting device comprising a frame having side bars and pivotally connected links pivotally connected to said bars at their upper ends in combination with a pivot rod disposed transversely through said side bars, nuts for securing said rod in position, said rod being screw threaded throughout its length, a sleeve having wrench engaging end portions and an internally screw threaded portion adjustably mounted upon said rod, said sleeve having a centrally arranged external annular groove, and a yoke loosely mounted in the groove on said sleeve centrally thereof, said yoke having outturned ears provided with registering apertures for suspension of a weighing scale.

In testimony whereof I affix my signature, in presence of two witnesses.

JOHN F. RICHARDSON.

Witnesses:
 FRANK McGUIRE,
 W. A. ANDERSON.

---

Copies of this patent may be obtained for five cents each, by addressing the "Commissioner of Patents, Washington, D. C."